United States Patent [19]

Massa et al.

[11] Patent Number: 5,925,507
[45] Date of Patent: Jul. 20, 1999

[54] PHOTOGRAPHIC FILM BASE AND PHOTOGRAPHIC ELEMENTS

[75] Inventors: Dennis J. Massa; James M. O'Reilly, both of Pittsford; Wen-Li A. Chen, Rochester, all of N.Y.

[73] Assignee: Eastman Kodak Company, Rochester, N.Y.

[21] Appl. No.: 09/007,292

[22] Filed: Jan. 14, 1998

[51] Int. Cl.$^6$ ...................................................... C03C 1/795
[52] U.S. Cl. .......................... 430/533; 430/536; 430/523; 525/146; 525/462
[58] Field of Search ..................................... 430/523, 536, 430/533; 525/146, 462

[56] References Cited

U.S. PATENT DOCUMENTS

| | | | |
|---|---|---|---|
| 5,034,263 | 7/1991 | Maier et al. | 428/215 |
| 5,104,723 | 4/1992 | Freitag et al. | 428/220 |
| 5,132,154 | 7/1992 | Westeppe et al. | 428/65 |
| 5,491,179 | 2/1996 | Mason | 525/136 |
| 5,512,632 | 4/1996 | Serini et al. | 525/67 |

*Primary Examiner*—Mark F. Huff
*Attorney, Agent, or Firm*—Sarah Meeks Roberts

[57] ABSTRACT

A highly useful photographic film base containing a miscible blend of is polyester containing at least 30 weight percent cyclohexylene dimethanol, CHDM/EG-PE, and a polycarbonate containing bisphenols, BP-PC, in specified proportions. Photographic elements prepared with this film base have a lesser tendency to take core-set and post process curl than do elements prepared with polyester containing cyclohexylene dimethanol, CHDM/EG-PE, film base.

14 Claims, No Drawings

PHOTOGRAPHIC FILM BASE AND PHOTOGRAPHIC ELEMENTS

FIELD OF THE INVENTION

This invention relates to a novel photographic film base prepared from a novel blend of polymers and to photographic elements containing this film base.

BACKGROUND OF THE INVENTION

Silver halide color photographic elements comprise one or more light sensitive layers coated on a support. Typically the support is a sheet of a transparent or translucent film, commonly referred to as a film base. Common film base materials for photographic elements are cellulose triacetate and poly(ethylene terephthalate). These materials have properties which render them suitable for photographic applications. More recently it has been proposed to use poly (ethylene napthalate) as a film base for photographic elements which are intended to be used in a cartridge of reduced diameter which requires rolling the film more tightly than previously. While conventional 35 mm film spools have diameters of about 11 mm, spools for proposed film cartridges have diameters as low as 7 mm, or lower. This is discussed in U.S. Pat. Nos. 5,294,473 and 5,368,997, incorporated by reference herein, which suggest that poly (ethylene naphthalate) has higher stiffness and lower propensity to take up core-set than either cellulose triacetate or poly(ethylene terephthalate).

Two disadvantages of poly(ethylene naphthalate) as a film support are as follows. In order to realize the curl and core-set advantages of films made from poly(ethylene naphthalate), it is necessary to anneal the film at elevated temperatures for substantial periods of time. Even then, the core-set and curl characteristics are not as good as would be desired. Secondly, the higher glass-transition temperature, or Tg, of poly(ethylene naphthalate) results in a higher melt viscosity and greater difficulty in melt processing.

Accordingly, it would be desirable to provide a film base with improved physical properties and processability. In particular it would be desirable to have a film base that has a lower propensity to curl and take up core-set while retaining adequate stiffness and tear strength. It also would be desirable to have such a film base which can be annealed using milder conditions. It also would be desirable to have such a film base that has a lower Tg and better melt processability.

We have found that a novel blend of a polyester containing at least 30 weight percent cyclohexylene dimethanol and a polycarbonate containing bisphenols provides a film base with a number of useful properties which makes it particularly advantageous for photographic films.

SUMMARY OF THE INVENTION

In one aspect, the present invention is a photographic film base comprising a miscible blend of from 50–95 weight percent of a polyester containing at least 30 weight percent cyclohexylene dimethanol, (CHDM/EG-PE), and from 50–5 weight percent of a polycarbonate containing bisphenols.

In another aspect the present invention is a silver halide photographic element comprising a film base bearing at least one silver halide imaging layer. The film base comprises a miscible blend of from 50–95 weight percent of a polyester containing at least 30 weight percent cyclohexylene dimethanol, (CHDM/EG-PE), and from 50–5 weight percent of a polycarbonate containing bisphenols.

DETAILED DESCRIPTION OF THE INVENTION

The present invention provides a film base that has desirable properties for use in photographic elements. These include low core-set, low post-process curl, good stiffness and moderate tear strength. In addition, these properties can be obtained without the need for annealing or by annealing for shorter times. These properties can also be obtained at compositions having moderate glass-transition temperatures and good melt processability. Film base of this invention has core-set properties which permits its use in small diameter cartridges, for example, diameters in the range of 3 to 12.5 mm.

Polyesters containing cyclohexylene dimethanol and terephthalate, sometimes abbreviated as CHDM/EG-PE, previously have been used alone or in combination with other polyesters as a support for photographic film, for example in U.S. Pat. Nos. 4,141,735, 5,034,263, 5,294,473, and 5,326,689 incorporated by reference herein.

Polycarbonates containing substituted cycloalkylidene bisphenols have been used as transparent media for optical recording as described in U.S. Pat. No. 5,132,154. Blends of polycarbonates containing substituted cycloalkylidene bisphenols with polyesters and other thermoplastics have been used as molding articles and films as described in U.S. Pat. Nos. 5,104,723 and 5,512,632. Thermally stable, gamma radiation-resistant blends of polyester copolymers containing cyclohexylene dimethanol and polycarbonates containing substituted cycloalkylidene bisphenols are described in U.S. Pat. No. 5,491,179. Although one or more of the polymer blends of this invention used as a film base can be the same polymer as described in this prior art, these patents and publications do not suggest that they would be suitable for use as a photographic film base. Nor does any of this art suggest that blending polyesters containing cyclohexylene dimethanol and polycarbonates containing bisphenols would have any influence on the core-set and post-process curl characteristics of a film based prepared from the blend, let alone suggest that such a blend would provide a film base in which these characteristics were improved.

The blends of this invention preferably have the following physical characteristics: a Tg of greater than 95° C.; a tensile modulus greater than 250 Kg/mm$^2$; light transmission greater than 80%; and haze less than 3%. The way in which these characteristics are determined is described in the Examples, infra.

While the relative proportions of CHDM/EG-PE and polycarbonates containing bisphenols (BP-PC) may vary somewhat with variations in the particular CHDM/EG-PE employed, as well as with the presence of other components in the blend, preferred proportions of CHDM/EG-PE and (BP-PC) in the blends of this invention are from 50 to 95 weight percent CHDM/EG-PE and from 5 to 50 weight percent of BP-PC, preferably from 50 to 90 weight percent CHDM/EG-PE and from 10 to 50 weight percent of BP-PC. For the property of manufacturability, the most preferred proportions are from 75 to 90 weight percent of CHDM/EG-PE and from 25 to 10 weight percent of BP-PC. When the proportion of BP-PC is increased, we have found that the crystallinity of the blend is lowered, the melt viscosity is higher, and a sheet formed from the blend is more difficult to stretch uniformly.

The CHDM/EG-PE may be a polyester containing cyclohexylene dimethanol (CHDM), ethylene glycol (EG), terephthalate (T), and isophthalate (I) groups in various proportions. Preferably it is a polyester which contains at least 30 weight percent CHDM and contains between 0 and 30 weight percent I. More preferably it is a polyester which contains at least 30 weight percent CHDM and which contains between 0 and 20 weight percent I. When both the EG and I contents are zero, the crystallization rate of the polyester is rapid and it is difficult to obtain clear films free of haze. Whereas when the EG content is zero, and the I content is 12 weight percent, for example, clear films free of haze are obtained after extrusion, stretching, and heat setting. When the CHDM content is between about 18 and 30 weight percent, the polyester is not sufficiently crystallizable and does not stretch uniformly. Whereas when the CHDM content is at least 30 weight percent, uniform stretching is achieved. When the CHDM content is zero, blends of CHDM/EG-PE with TMCBP/BPA-PC are found to be not miscible and hazy. Whereas when the CHDM content is greater than about 30 weight percent, blends with TMCBP/BPA-PC are miscible and clear.

The CHDM/EG-PE polyesters used in the polymer blends of this invention preferably have molecular weights represented by inherent viscosities in the range of 0.5 to 1.0 dL/gm. (Inherent viscosity is measured in a Ubbelhode capillary viscometer (Shott Gerate 536-13) at 25° C. and at a polymer concentration of 0.25 g/dL in a 60/40 mixture by weight of phenol and chlorobenzene.) The CHDM/EG-PE used in the polymer blends of this invention preferably have a glass transition temperature (Tg), between 75 and 95° C. Polyesters containing CHDM, EG, T, and I are commercially available from Eastman Chemical Company, 100 North Eastman Road, P.O. Box 511, Kingsport, Tenn. 37662-5075 under various trade names such as Eastar®, Spectar®, PCTG®, and PETG®.

Polycarbonates containing bisphenols are prepared by the usual methods, preferably by the two-phase interfacial process, as described in U.S. Pat. No. 5,227,458, incorporated by reference herein. Preferably, the BP-PC has a molecular weight represented by inherent viscosities of from 0.3–1.2 dL/g in methylene chloride. The BP-PC used in this invention typically contains both cycloalkylidene bisphenol as well as isopropylidene bisphenol, in the mole fractions ranging from 1 to 100% cycloalkylidene bisphenol. The BP-PC used in this invention preferably has a glass transition temperature (Tg) of from 155–238° C. The Tg depends upon the amount of cycloalkylidene bisphenol (TMCBP)—for example, 20% TMCBP (Tg=174° C.), 35% TMCBP (Tg=187° C.), 55% TMCBP (Tg=205° C.), or 100% TMCBP (Tg=238° C.). In addition, the BP-PC should be miscible with the CHDM/EG-PE. By miscible is meant that the blend of the two polymers has a single glass transition temperature (Tg) and that a photographic film base made from the blend is clear. Polycarbonates containing cycloalkylidene bisphenol, or TMCBP/BPA-PC, are commercially available from Bayer Corporation, Polymers Division, 100 Bayer Road, Pittsburgh, Pa. 15205-9741 under the APEC® trade name. Examples of APEC® polycarbonates are APEC® 9330, APEC® 9350, and APEC® 9371.

Polymer blends can be prepared by combining CHDM/EG-PE and BP-PC using compounding techniques known to those skilled in the art. As part of the compounding procedure of polyesters with polycarbonates, it is common to add stabilizers such as aryl or alkyl phosphites, as described in Intl. Patent Appl. No. WO9303092 and U.S. Pat. No. 4,491,179, the disclosures of which are incorporated herein by reference. Blending of TMCBP/BPA-PC with thermoplastic polymers is broadly described U.S. Pat. Nos. 5,104,723 and 5,512,632, the disclosures of which are incorporated herein by reference. When the proportion of BP-PC is decreased below about 5 percent the improvement in physical performance of the blend becomes insignificant. A sheet formed from the blend becomes more difficult to stretch uniformly than the polyester alone, thus making the sheet more difficult to manufacture. The difficulty of manufacture increases as the proportion of BP-PC in the blend increases. Preferably the proportion of BP-PC is between 10 and 50 percent by weight. More preferably the proportion of BP-PC is between 10 and 35 percent by weight. Most preferably the proportion of BP-PC is between 10 and 25 percent by weight. It is preferred that the BP-PC is TMCBP/BPA-PC.

Film base is prepared from the polymer blend by techniques known to those skilled in the art. These techniques are described in detail in Schrader, U.S. Pat. No. 4,141,735, the disclosure of which is incorporated herein by reference. A film base is understood to be a planar sheet having a thickness in the range of 50 to 200 μm, preferably a thickness of 70 to 110 μm. In a typical operation, the film base is formed by extruding the polymer blend at a temperature of 290 to 320° C. through a sheeting die and casting the molten sheet on a chill roll at a temperature of 60 to 120° C. The cast sheet is then stretched biaxially to from 2 to 5 times its initial lateral dimensions. Stretching can be at a temperature in the range of from 100 to 180° C. Following biaxial stretching the film base is heatset at a temperature of from 125 to 250° C. for a time of from 0.1 to 60 sec. More preferably, following biaxial stretching the film base is heatset at a temperature of from 200 to 250° C. for a time of from 0.1 to 10 sec. If the film base is to be annealed, it can be annealed at a temperature in the range of from 50° C. up to the Tg of the polymer blend for a time in the range of 0.1 to 1000 hours. Film base with core-set characteristics useful for small diameter film cartridges can be obtained with preferred blends of this invention by annealing at temperatures of between about 80 and 135° C. for times of 2 to 168 hours.

Film base prepared from polymer blends of this invention can contain other components commonly found in film supports for photographic elements. These include dyes, lubricants and particles of organic and inorganic materials such as glass beads. These are described in more detail in *Research Disclosure,* February 1995, Item 37038, pages 79–114, *Research Disclosure,* September 1996, Item 38957 pages 591–639 incorporated by reference herein.

Film base prepared from polymer blends of this invention can bear layers commonly found on film supports used for photographic elements. These include magnetic recording layers, subbing layers between other layers and the support, photosensitive layers, interlayers and overcoat layers, as are commonly found in photographic elements. These layers can be applied by techniques known in the art and described in the references cited in *Research Disclosure* Items 37038 and 38957 cited above.

Magnetic recording layers that can be used in photographic elements of this invention are described in U.S. Pat. Nos. 3,782,947; 4,279,945; 5,147,768; 5,252,441; 5,254, 449; 5,395,743; 5,397,826; 5,413,902; 5,427,900, 5,432, 050, 5,434,037, 5,436,120, in *Research Disclosure* November 1992, Item 34390, pages 869 et seq., and in Hatsumei Kyouk,ai Gihou No. 94-6023, published Mar. 15, 1994 by Hatsumei Kyoukai, Japan incorporated by reference herein.

Photographic elements of this invention can have the structures and components shown on *Research Disclosure* Items 37038 and 38957 cited above and can be imagewise exposed and processed using known techniques and compositions, including those described in the *Research Disclosure* Items 37038 and 38957 cited above.

The following examples further illustrate this invention.

Blends were prepared from the polyesters and polycarbonates shown in Table 1.

TABLE 1

Polymers Used in Example Film Bases

| Polymer: | Polymer Type: | Polymer Name or Trade Name: |
|---|---|---|
| PE1 | Polyester | Poly(cyclohexylenedimethylene terephthalate) |
| PE2 | Polyester | PCTG 10179 |
| PE3 | Polyester | PCTA A150 |
| PC1 | Polycarbonate | Makrolon (BPA-PC) |
| PC2 | Polycarbonate | APEC 9350 (TMCBP/BPA-PC) |
| PC3 | Polycarbonate | APEC 9371 (TMCBP/BPA-PC) |

Sheets formed from CHDM/EG-PE and blends of CHDM/EG-PE and BP-PC in the proportions shown in Table 2. A typical blend compounding and film preparation method is given as follows. The polyester PE1 was dried at 149° C. for 4 to 6 hours before dry blending with 1-wt % Weston 619 stabilizer (General Electric Company Specialty Chemicals Division) and extruding at 300° C. and pelletized using a Welding Engineers twin-screw extruder. The pelletized and stabilized polyester was then dry blended with PC2 in a 3/1 ratio by weight and dried at 93° C. for 10 hours and then was then extruded through a sheeting die and cast on a chill roll to a thickness of 1 mm. Cast sheets made by this method were then stretched biaxially and heat set under the conditions indicated in Table 3.

TABLE 2

Film Base Compositions

| Example: | Film Base Resin Composition: |
|---|---|
| Comparative Example A | 100 parts Poly(ethylene naphthalate) |
| Comparative Example B | 100 parts Poly(ethylene terephthalate) |
| Comparative Example C | 100 parts Polymer PE1 |
| Comparative Example D | 100 parts Polymer PE2 |
| Comparative Example E | 100 parts Polymer PE3 |
| Example F | 82.5 parts PE1, 17.5 parts PC1 |
| Example G | 75 parts PE1, 25 parts PC1 |
| Example H | 65 parts PE1, 35 parts PC1 |
| Example I-1 | 75 parts PE1, 25 parts PC2 |
| Example I-2 | 75 parts PE1, 25 parts PC2 |
| Example J | 75 parts PE1, 25 parts PC3 |
| Example K | 90 parts PE2, 10 parts PC1 |
| Example L | 70 parts PE2, 30 parts PC1 |
| Example M-1 | 75 parts PE2, 25 parts PC2 |
| Example M-2 | 75 parts PE2, 25 parts PC2 |
| Example M-3 | 75 parts PE2, 25 parts PC2 |
| Example N | 75 parts PE2, 25 parts PC3 |
| Example O | 75 parts PE3, 25 parts PC2 |
| Example P | 75 parts PE3, 25 parts PC3 |
| Example Q | 50 parts PE3, 25 parts PE1, 25 parts PC1 |

TABLE 3

Film Base Preparation Conditions

| Example: | Stretch Ratio: | Stretch Temperature (° C.): | Heatset Temperature (° C.): |
|---|---|---|---|
| Comparative Example A | 3.5 × 3.5 | 151 | 180 |
| Comparative Example B | 3.3 × 3.0 | 95 | 216 |
| Comparative Example C | 2.5 × 2.5 | 105 | 140 |
| Comparative Example D | 3.0 × 3.0 | 96 | 128 |
| Comparative Example E | 3.0 × 3.0 | 101 | 130 |
| Example F | 3.0 × 3.0 | 115 | 130 |
| Example G | 3.0 × 3.0 | 122 | 135 |
| Example H | 3.0 × 3.0 | 126 | 135 |
| Example I-1 | 3.0 × 3.0 | 125 | 140 |
| Example I-2 | 3.0 × 3.5 | 127 | 224 |
| Example J | 3.0 × 3.0 | 140 | 155 |
| Example K | 3.0 × 3.0 | 100 | 125 |
| Example L | 3.0 × 3.0 | 116 | 130 |
| Example M-1 | 2.5 × 2.5 | 120 | 130 |
| Example M-2 | 3.0 × 3.5 | 127 | 224 |
| Example M-3 | 2.8 × 3.75 | 127 | 224 |
| Example N | 2.5 × 2.5 | 120 | 130 |
| Example O | 3.0 × 3.0 | 125 | 135 |
| Example P | 3.0 × 3.0 | 130 | 140 |
| Example Q | 2.9 × 3.5 | 143 | 221 |

The resulting films were evaluated for core-set and tensile properties and optical properties, as described below. The results are reported in Tables 4–7.

Glass Transition Temperature: Samples of each composition were heated in a differential scanning calorimeter (DSC7 sold by Perkin-Elmer of Norwalk, Conn.) from about 20° C. to 300° C. at 10° C./min, then quenched back to 20° C. and finally reheated to 300° C. at 10° C./min. The Tg reported is the mid-point temperature in the first transition of the first thermogram.

Tensile Properties: Five lengthwise and five widthwide strips 150 mm×15 mm were cut from each of the films prepared above. A Sintech tensile tester (available from Sintech Inc. 378 Page St., Stoughton, Mass. 02072) was used to measure representative tensile properties in accordance with ASTM D882. The properties measured (and the units in which they are reported in Table 3) are: tensile modulus ($Kg/mm^2$), yield stress ($Kg/mm^2$), break stress ($Kg/mm^2$) and break elongation (%).

Tear Strength: Five lengthwise and five widthwide strips 75 mm×25 mm were cut from each of the film bases prepared above and tested in accordance with ASTM D1938. Tear strength is reported as the force (g) needed to propagate the tear.

Optical Properties: Both haze and light transmission were measured using a BYK-Gardener XL-211 hazemeter (available from BYK-Gardener Inc., 2435 Linden La., Silver Springs, Md. 20910) according to the procedure at ASTM D1003-61.

Core-Set (CS): For each of the tests shown below, six lengthwise strips 150 mm×35 mm were cut from each of the films prepared above. The strips were conditioned at 21° C./50% relative humidity overnight and their curl was measured according to Test Method A in ANSI P41.29-1985. The results are reported in terms of $1/R$, $m^{-1}$, where R is the radius of curvature of the curled film.

The following winding conditions were used in the core-set tests:

CSI: the film base was held at 80° C./50%RH for 2 hrs on a 7 mm diameter core.

CSII: the film base was held at 49° C./50%RH for 24 hrs on a 12.5 mm diameter core.

The same core-set measurements were repeated for samples of the films that had been annealed at temperature from 95 to 105° C. for 24 hrs.

Post-Process Curl (PPC): The samples that had been submitted to the core-set tests were soaked in water at 38°

C. for 15 min and then dried at 50° C. for 3 min with a 50 g weight hung from each strip. After the weight was removed the strips were allowed to equilibrate at 21° C./50% relative humidity for 16 hrs. And then curl was measured in the same way as had been done to determine core-set.

The properties for five comparative examples of polyester film bases are given in Table 4.

TABLE 4

Film Properties for Comparative Examples

| Example: | A | B | C | D | E |
|---|---|---|---|---|---|
| Tg (° C.) | 120 | 75 | 88 | 86 | 93 |
| Thickness ($\mu$m) | 65 | 99 | 85 | 90 | 99 |
| Tensile Modulus (Kg/mm$^2$) | 650 | 500 | 280 | 300 | 310 |
| Yield Stress (Kg/mm$^2$) | 15 | 11 | 8.4 | 7.8 | 8.9 |
| Break Stress (Kg/mm$^2$) | 20 | 20 | 15 | 14 | 15 |
| Break Elong. (%) | 56 | 94 | 58 | 71 | 54 |
| Tear Strength (g) | 45 | 87 | 23 | 37 | 22 |
| Haze (%) | 0.8 | 0.9 | 0.4 | 0.6 | 0.2 |
| Light Trans. (%) | 85 | 88 | 90 | 90 | 90 |
| Core-Set and Post-Process Curl | | | | | |
| Unannealed | | | | | |
| CSI (1/m) | 138 | 167 | 136 | 171 | 155 |
| PPCI (1m) | 103 | 157 | 113 | 149 | 127 |
| CSII (1/m) | 49 | 50 | 57 | 61 | — |
| PPCII (1/m) | 25 | 31 | 35 | 45 | — |
| Annealed | | | | | |
| CSI (1/m) | 98 | — | 69 | 98 | 133 |
| PPCI (1/m) | 84 | — | 28 | 84 | 113 |
| CSII (1/m) | 26 | — | 35 | 17 | — |
| PPCII (1/m) | 15 | — | 11 | 17 | — |

Table 5 lists the properties of films made from PE1/polycarbonate blends. It can be seen from examples C, F, G, and H, that films containing PC1 have better core set properties (lower core set values and lower post process curl) than PE1 alone, and that the core set and post process curl behaviors improve (i.e., become lower in value) as the proportion of PC1 increases. Further improvement in core set is seen when one uses the APEC® polycarbonates containing substituted cycloalkylidene bisphenols, with the core set improvement being best in the PE1/PC3 blend. These core set values are extraordinarily low and unexpected. They are significantly better than PEN (Comparative example A, Table 4), even though the glass transition temperatures (Tg) of the blend films are no more than 110° C., compared with PEN's Tg of 120° C. The lower Tg of the blends also gives them improved processability over PEN, as it allows them to be processed at lower temperatures and lower melt viscosities.

TABLE 5

Film Properties for Blends Containing PE1

| Example: | F | G | H | I-1 | I-2 | J |
|---|---|---|---|---|---|---|
| Tg (° C.) | 101 | 105 | 110 | 107 | 110 | 112 |
| Thickness ($\mu$m) | 100 | 98 | 81 | 107 | 99 | 79 |
| Tensile Modulus (Kg/mm$^2$) | 300 | 340 | 300 | 270 | 310 | 260 |
| Yield Stress (Kg/mm$^2$) | 8.8 | 8.7 | 7.7 | 8.3 | 8.2 | 7.7 |
| Break Stress (Kg/mm$^2$) | 12 | 13 | 13 | 14 | 13 | 10 |
| Break Elong. (%) | 35 | 36 | 61 | 42 | 58 | 45 |
| Tear Strength (g) | 17 | 19 | 19 | 17 | 17 | 21 |
| Haze (%) | 0.3 | 1.8 | 0.4 | 0.3 | 4 | 1.0 |
| Light Trans. (%) | 89 | 88 | 90 | 88 | 85.3 | 89 |

TABLE 5-continued

Film Properties for Blends Containing PE1

| Example: | F | G | H | I-1 | I-2 | J |
|---|---|---|---|---|---|---|
| Core-Set and Post-Process Curl | | | | | | |
| Unannealed | | | | | | |
| CSI (1/m) | 136 | 125 | 114 | 108 | 121 | 101 |
| PPCI (1m) | 115 | 107 | 97 | 89 | 102 | 80 |
| CSII (1/m) | — | — | — | 44 | — | 44 |
| PPCII (1/m) | — | — | — | 28 | — | 28 |
| Annealed | | | | | | |
| CSI (1/m) | 59 | 57 | 52 | 55 | 57 | 47 |
| PPCI (1/m) | 44 | 38 | 30 | 43 | 38 | 35 |
| CSII (1/m) | — | — | — | 15 | — | 12 |
| PPCII (1/m) | — | — | — | 8 | — | 6 |

Table 6 lists the properties of films made from PE2/polycarbonate blends. It can be seen from examples D, K, and L, that films containing PC1 have better core set properties (lower core set values and lower post process curl) than PE2 alone, and that the core set and post process curl behaviors improve (i.e., become lower in value) as the proportion of PC1 increases. Further improvement in core set is seen when one uses the APEC> polycarbonates containing substituted cycloalkylidene bisphenols, PC2 and PC3, with the core set improvement being best in the PE2/PC3 blend. The PE2/polycarbonate blends have improved tear strengths over those of PE1/polycarbonate blends of similar compositions. Examples M-2 and M-3 have tear strengths higher than that of PE2 alone and more than twice as high as those of the PE1/polycarbonate blends. PE2/polycarbonate blends also crystallize more slowly than PE1/polycarbonate blends and are easier to quench to a clear film when the film is thicker or when the casting wheel is hotter.

TABLE 6

Film Properties for Blends Containing PE2

| Example: | K | L | M-1 | M-2 | M-3 | N |
|---|---|---|---|---|---|---|
| Tg (° C.) | 109 | 113 | 107 | 107 | 105 | 110 |
| Thickness ($\mu$m) | 93 | 101 | 76 | 85 | 104 | 77 |
| Tensile Modulus (Kg/mm$^2$) | 290 | 270 | 240 | 290 | 250 | 250 |
| Yield Stress (Kg/mm$^2$) | 7.7 | 6.8 | 6.0 | 6.7 | 5.1 | 6.5 |
| Break Stress (Kg/mm$^2$) | 14 | 11 | 8.9 | 9.1 | 7.4 | 10 |
| Break Elong. (%) | 71 | 96 | 105 | 111 | 103 | 95 |
| Tear Strength (g) | 29 | 31 | 20 | 45 | 50 | 20 |
| Haze (%) | 0.5 | 0.6 | 0.4 | 0.3 | 0.8 | 0.3 |
| Light Trans. (%) | 89 | 89 | 90 | 90 | 88 | 90 |
| Core-Set and Post-Process Curl | | | | | | |
| Unannealed | | | | | | |
| CSI (1/m) | 157 | 154 | 151 | 167 | 166 | 145 |
| PPCI (1m) | 157 | 138 | 133 | 154 | 153 | 127 |
| CSII (1/m) | 63 | 55 | — | — | — | — |
| PPCII (1/m) | 49 | 39 | — | — | — | — |
| Annealed | | | | | | |
| CSI (1/m) | 118 | 98 | 69 | 87 | 85 | 71 |
| PPCI (1/m) | 113 | 84 | 52 | 70 | 64 | 50 |
| CSII (1/m) | 22 | 17 | — | — | — | — |
| PPCII (1/m) | 15 | 12 | — | — | — | — |

Table 7 lists the properties of films made from blends containing PE3. It can be seen from examples E, O, P, and Q, that films containing polycarbonate have better core set properties (lower core set values and lower post process curl) than PE3 alone. The core set behaviors improve (i.e., become lower in value) when one uses the APEC® polycarbonates containing substituted cycloalkylidene bisphenols, with the core set improvement being best in the PE3/PC3 blend (example P). These core set values are extraordinarily low and unexpected. They are comparable to PE1/polycarbonate blends of similar compositions and Tg's, and are significantly lower than PEN (Comparative example A, Table 4), even though the glass transition temperatures (Tg) of the blends are no more than 100° C., compared with PEN's Tg of 120° C. The lower Tg of the blends also gives them improved processability over PEN, as it allows them to be processed at lower temperatures and lower melt viscosities. In addition, PE3 blends, like PE2 blends, have a lower rate of crystallization than PE1 blends and are easier to quench to a clear film when the film is thicker or when the casting wheel is hotter.

TABLE 7

Film Properties for Blends Containing PE3

| Example: | O | P | Q |
|---|---|---|---|
| Tg (° C.) | 109 | 112 | 99.5 |
| Thickness (µm) | 81 | 77 | 122 |
| Tensile Modulus (Kg/mm$^2$) | 270 | 270 | 390 |
| Yield Stress (Kg/mm$^2$) | 7.4 | 7.7 | 7.8 |
| Break Stress (Kg/mm$^2$) | 12 | 12 | 12 |
| Break Elong. (%) | 59 | 64 | 73 |
| Tear Strength (g) | 21 | 26 | 25 |
| Haze (%) | 0.4 | 0.2 | 0.4 |
| Light Trans. (%) | 89 | 89 | 90 |
| Core-Set and Post-Process Curl | | | |
| Unannealed | | | |
| CSI (1/m) | 126 | 118 | 167 |
| PPCI (1m) | 114 | 98 | 148 |
| CSII (1/m) | — | — | 62 |
| PPCII (1/m) | — | — | 48 |
| Annealed | | | |
| CSI (1/m) | 59 | 57 | 83 |
| PPCI (1/m) | 44 | 38 | 64 |
| CSII (1/m) | — | — | 24 |
| PPCII (1/m) | — | — | 15 |

From the results reported in Tables 4–7, it can be seen that improvements in core-set and post process curl are obtained while maintaining good mechanical properties and good optical properties.

The invention has been described in detail with particular reference to certain preferred embodiments thereof, but it will be understood that variations and modifications can be effected within the spirit and scope of the invention.

What is claimed is:

1. A photographic film base comprising a miscible blend of from 50 to 95 weight percent polyester containing at least 30 weight percent cyclohexylene dimethanol, and from 50 to 5 weight percent of a polycarbonate containing bisphenols.

2. A photographic film base of claim 1, comprising a miscible blend of from 50 to 90 weight percent polyester containing at least 30 weight percent cyclohexylene dimethanol, and from 50 to 10 weight percent of a polycarbonate containing bisphenols.

3. A photographic film base of claim 1, comprising a miscible blend of from 50 to 65 weight percent polyester containing at least 30 weight percent cyclohexylene dimethanol, and from 50 to 35 weight percent of a polycarbonate containing bisphenols.

4. A photographic film base of claim 1, comprising a miscible blend of from 75 to 90 weight percent polyester containing at least 30 weight percent cyclohexylene dimethanol, and from 25 to 10 weight percent of a polycarbonate containing bisphenols.

5. A photographic film base of claim 1, wherein the polymer blend has a Tg of greater than 95° C. and a tensile modulus of greater than 250 Kg/mm$^2$.

6. A photographic film base of claim 1 that has been annealed at a temperature in the range of from 50° C. up to the Tg of the polymer blend for a time in the range of 0.1 to 1000 hours.

7. A photographic film base of claim 1 wherein the polycarbonate contains substituted cycloalkylidene bisphenols.

8. A silver halide photographic element comprising a film base bearing at least one photographic layer, the film base comprising a miscible blend of from 50 to 95 weight percent is polyester containing at least 30 weight percent cyclohexylene dimethanol, and from 50 to 5 weight percent of a polycarbonate containing bisphenols.

9. A photographic element of claim 8, wherein the film base comprises a miscible blend of from 50 to 90 weight percent polyester containing at least 30 weight percent cyclohexylene dimethanol, and from 50 to 10 weight percent of a polycarbonate containing bisphenols.

10. A photographic element of claim 8 wherein the film base comprises a blend of from 50 to 65 weight percent polyester containing at least 30 weight percent cyclohexylene dimethanol, and from 50 to 35 weight percent of a polycarbonate containing bisphenols.

11. A photographic element of claim 8 wherein the film base comprises a blend of from 75 to 90 weight percent polyester containing at least 30 weight percent cyclohexylene dimethanol, and from 25 to 10 weight percent of a polycarbonate containing bisphenols.

12. A photographic element of claim 8, wherein the film base bears a magnetic recording layer.

13. A photographic element of claim 8, wherein the film base has light transmission of greater than 80% and haze of less than 3%.

14. A photographic element of claim 8 wherein the polycarbonate contains substituted cycloalkylidene bisphenols.

* * * * *